2,995,437
DEFLUORINATION OF PHOSPHATE ROCK
Clinton A. Hollingsworth, Lakeland, Fla., assignor to Smith-Douglass Company, Incorporated, Norfolk, Va., a corporation of Virginia
Filed Apr. 23, 1959, Ser. No. 808,336
10 Claims. (Cl. 71—46)

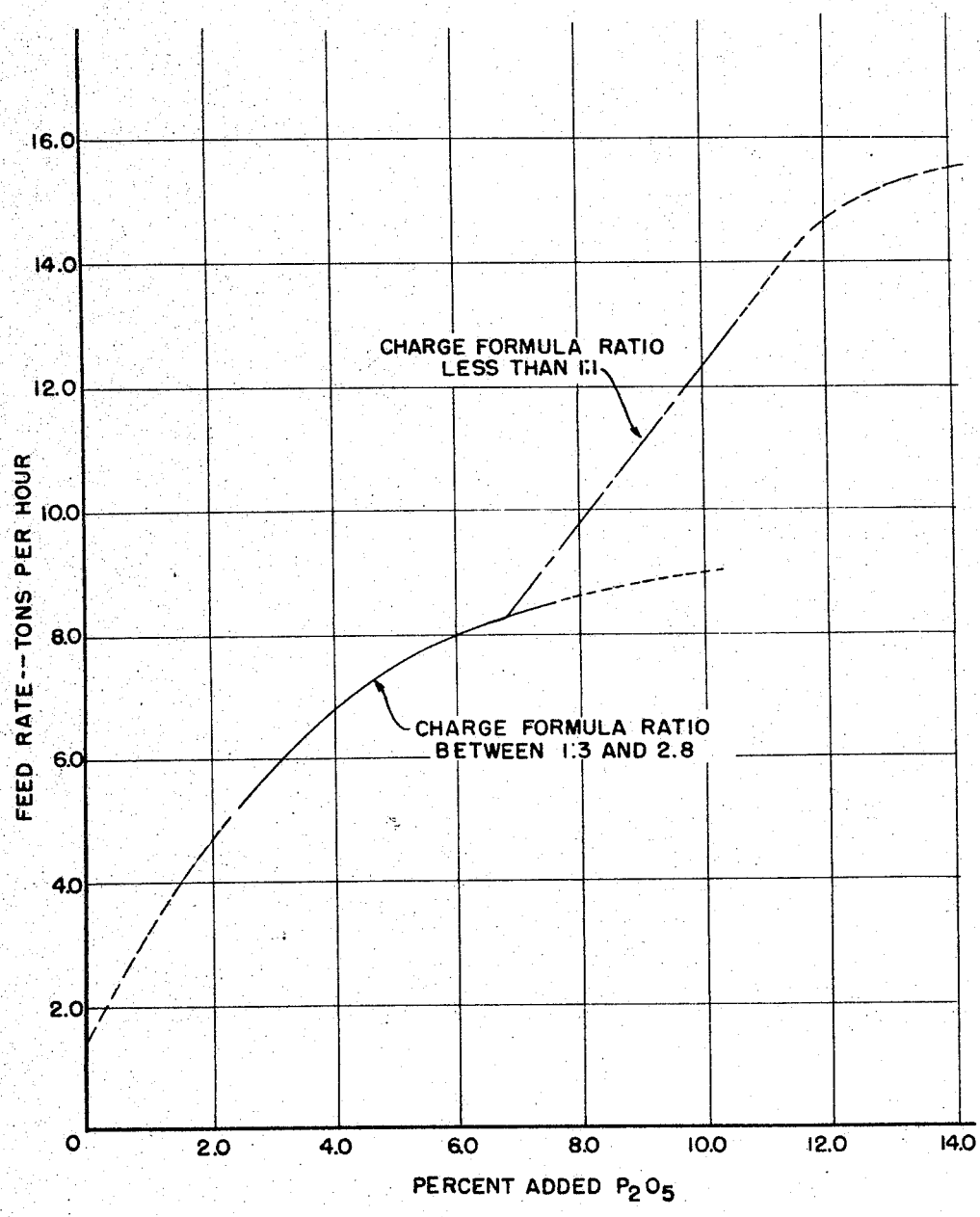

This invention relates to the defluorination of phosphate rock and similar natural phosphate materials, and in particular it relates to an improvement in the method of defluorinating such phosphatic materials by heating the material to the relatively high temperature at which fluorine is driven therefrom.

United States Patent No. 2,839,377, granted June 17, 1958, to Clinton A. Hollingsworth and John C. Williams, describes a method for defluorinating phosphate rock by calcination of the rock at a temperature of at least 2600° F. without substantial fusion in the presence of water vapor and of a reagent mixture consisting essentially of the reaction product of sodium carbonate and phosphoric acid. The mol ratio of the $Na_2O$ to $P_2O_5$ content of the reaction product is maintained between 1.6 and 2.8, and the $CaO$, $Na_2O$, $P_2O_5$ and $SiO_2$ content of the combined phosphate rock and reagent mixture is such that the mol ratio of these constituents in the formula $$\frac{\text{Mols } CaO + Na_2O - 3P_2O_5}{\text{Mols } SiO_2}$$

is between 1.3 and 2.8. The charge is maintained at the calcining temperature for a sufficient period of time to produce a phosphate product having high fertilizer availability and containing less than one part of fluorine for each 40 parts of phosphorus. The method produces a high quality and commercially valuable defluorinated phosphate rock product.

In the process described in the patent, the phosphate rock and the aqueous reaction product obtained by reacting sodium carbonate (or some other equivalent sodium compound) with an aqueous solution of phosphoric acid (or some equivalent acid phosphate compound) are introduced into the feed or cold end of a rotary kiln, the aqueous reaction product advantageously being run into the kiln and there being mixed with the rock by the tumbling action resulting from the rotation of the kiln. The phosphate rock ordinarily contains between 10 to 14% of moisture, and such additional amount of water may be introduced into the kiln, along with the rock and reagent mixture, as to form at the feed end of the kiln a slurry containing from 30 to 40% of water. The water content of the charge is, of course, volatilized by the intense heat within the kiln, and this evolved water vapor together with the combustion gases are removed from the kiln at the feed end thereof. Fuel, e.g. fuel oil, is introduced into the kiln at the hot or clinker discharge end thereof, and the combustion gases travel through the kiln countercurrent to the flow of charge material therethrough, the water vapor content of the combustion gases aiding in the defluorination of the rock in its passage through the kiln.

As a result of years of experience with this process on a commercial scale, and of additional laboratory and pilot plant investigations, it has been found that as the amount of the reaction product (prepared from sodium carbonate and phosphoric acid) added to the rock is gradually increased there is a proportionate gradual increase in the ease of defluorination of the rock, and further that this proportionate increase in ease of defluorination continues until the amount of $P_2O_5$ in the reaction product added to the charge approaches about 6% by weight of the total charge at which point the increase starts to level off. Increased ease of defluorination means in practice that the rate of feed, and hence the productivity, of a given kiln or other thermal reactor is correspondingly increased. However, the molar ratios specified in the patented process for the $Na_2O$-$P_2O_5$ reaction product (i.e., a mol ratio of between 1.6 and 2.8) and for the overall charge (i.e., a charge formula mol ratio of between 1.3 and 2.8) were found to be essential in order to avoid fusion and balling up of the charge in the kiln and to permit defluorination of the charge at practical operating temperatures. Moreover, maintenance of the specified molar ratios requires a proportionate increase in the amount of $Na_2O$ as the amount of $P_2O_5$ added to the charge is increased. Therefore, the economic advantages flowing from the increased productivity of the kiln made possible by the increase in reaction product added to the feed, and the improvement in grade of the defluorinated phosphate product due to the presence of the greater amount of added $P_2O_5$, are increasingly offset by the increased cost of the reagents employed, by the dilution of the phosphate product by the sodium compounds added to the initial charge, and by the aforementioned leveling off of the increase in ease of defluorination of the charge, and hence in productivity of the kiln, when the amount of $P_2O_5$ added to the charge exceeds about 6% by weight of the total charge. As a consequence, in the preferred practice of the process described in the patent the amount of added phosphoric acid (calculated as $P_2O_5$) is maintained at about 3.6%, and when the amount of added $P_2O_5$ exceeds about 6% by weight of the total charge the process becomes uneconomic due to the aforementioned factors and particularly to the leveling off of the increase in productivity.

I have now discovered that a marked improvement in this process can be achieved by increasing the amount and altering the composition of the additive or reaction product mixed with the phosphate rock prior to calcination. Specifically, I have found that there is a marked and unexpected increase in the ease of defluorination of the charge when the amount of $P_2O_5$ added to the charge exceeds about 7% and that it continues to increase sharply until the added $P_2O_5$ reaches about 12% by weight of the charge. Moreover, contrary to previous experience with the aforementioned patented process employing an appreciably smaller amount of added $P_2O_5$, I have found that when the charge formula mol ratio is maintained at less than 1.1 and when certain other reaction conditions are maintained as hereinafter described, the marked increase in ease of defluorination (and hence in productivity) is accompanied by satisfactory defluorination of the rock at lower temperatures, lower fuel requirements, less dust loss and hence higher product recovery, fewer burning problems such as excessive coating, balling, etc. and other important advantages that will appear from the ensuing description of my invention. That is to say, in the practice of the process of my prior patent it is essential to maintain a charge formula mol ratio of at least 1.3 when the amount of $P_2O_5$ added to the charge is less than about 6% by weight of the total charge in order to avoid fusion and balling up of the kiln, and when the added $P_2O_5$ exceeds about 6% by weight of the total charge there is a leveling off in productivity that renders my prior process uneconomic. In contrast to this, I have now found that when the amount of added $P_2O_5$ exceeds about 7% by weight of the total charge the charge formula mol ratio can be maintained at less than 1.1 without balling up of the kiln, and I have further found that when the charge formula mol ratio is maintained at less than 1.1 and when the amount of added $P_2O_5$ is increased from 7% to 12% by weight there is a marked increase in productivity that does not occur when the charge formula mol ratio and other reaction conditions are those specified in the process of the prior patent.

Accordingly, my improvement in the aforementioned method of defluorinating phosphate rock comprises maintaining the weight ratio of the added sodium compound (calculated as $Na_2O$) to the added acid phosphate compound (calculated as $P_2O_5$) between 0.5 and 0.8, maintaining the amount of the acid phosphate compound (calculated as $P_2O_5$) added to the charge between 7% and 12% by weight of the total charge on a dry basis, maintaining the amount of sodium compounds (calculated as $Na_2O$) in the charge between about 0.3 and about 0.7 mol per mol of $P_2O_5$ present in the phosphate rock, maintaining the silica content of the charge between about 2% and 6% by weight of the total charge on a dry basis, maintaining the CaO, $Na_2O$, $P_2O_5$ and $SiO_2$ content of the combined phosphate rock and reagent mixture such that the mol ratio of these constituents in the formula $$\frac{\text{Mols } CaO + Na_2O - 3P_2O_5}{\text{Mols } SiO_2}$$

does no exceed 1.1, and maintaining the charge mixture at a temperature of at least 2200° F. for a sufficient time to produce a phosphate product having high ferilizer availability and containing less than 1 part of fluorine per each 100 parts of phosphorus. Moreover, the relative proportions of the various constituents in the charge mixture of my improved process make it possible to use dry agglomerates of the charge mixture as the feed material for the kiln or other heat treatment apparatus, and makes it possible to carry out my new process in a fluidized bed reactor.

In the practice of my invention the phosphate rock to be defluorinated is usually the product of a phosphate rock mill or concentrator having a typical average analysis of about 35% $P_2O_5$, about 50% CaO, about 4% fluorine, and about 2 to 6% insoluble matter consisting mainly of silica, and having an average particle size of between about through 10 mesh and on 150 mesh (Tyler Standard Screen). Commercial light soda ash having an $Na_2O$ content of about 58% (over 98% $Na_2CO_3$) is usually employed as the sodium-containing reagent, although other sodium compounds such as sodium bicarbonate, sodium hydroxide, sodium phosphate and sodium chloride have been successfully employed in the practice of my invention. The acid phosphate reagent usually employed is crude commercial phosphoric acid obtained by reacting sulphuric acid with a phosphate-bearing material, e.g. phosphate rock, although other acid phosphate compounds such as the acidic sodium salts of the phosphorus acids have successfully been employed. The $Na_2O$- and $P_2O_5$-containing reagents are mixed and reacted together either before or after being admixed with the phosphate rock material, and these reagents and the rock are mixed and reacted together either before or after being introduced into the thermal reaction apparatus.

The amounts of the sodium- and acid phosphate-containing reagents added to the phosphate rock are such that the weight ratio of the added sodium compound (calculated as $Na_2O$) to the added acid phosphate compound (calculated as $P_2O_5$) is between 0.5 and 0.8, and preferably between 0.6 and 0.7, and the amount of the phosphate compound (calculated as $P_2O_5$) added to the charge is between 7% and 12%, and preferably between 9% and 10%, by weight of the total charge on a dry basis. The aforementioned amount of $P_2O_5$ added to the charge is equivalent to about 0.2 to 0.4 mol of added $P_2O_5$ per mol of $P_2O_5$ present in the phosphate rock, and the preferred range is equivalent to about 0.28 to 0.38 mol of added $P_2O_5$ per mol of $P_2O_5$ in the rock. Additions of $P_2O_5$ greater than the specified maximum quantities result in fusion of the charge and/or loss of $P_2O_5$ from the charge by volatilization. Thus, such amount of the reagents is mixed with the phosphate rock that the final mix or calcining charge comprises about 11.0 to 21.6% by weight of added $Na_2O$ and $P_2O_5$ in the form of the aforementioned reaction product, the balance being the phosphate rock. Moreover, the total amount of all sodium compounds in the charge (calculated as $Na_2O$) is maintained between about 0.3 mol and about 0.7 mol per mol of $P_2O_5$ present in the phosphate rock, and the CaO, $Na_2O$, $P_2O_5$ and $SiO_2$ content of the combined phosphate rock and reagents mixture is such that the mol ratio of these constituents in the overall charge formula $$\frac{\text{Mols } CaO + Na_2O - 3P_2O_5}{\text{Mols } SiO_2}$$

does not exceed 1.1, and preferably is maintained between about 0.4 and 0.8. Finally, the charge must contain sufficient silica (at least about 2% and preferably at least about 2.5% $SiO_2$ by weight of the rock) to accomplish defluorination of the rock, but insufficient (not more than about 6% and preferably not more than about 4.5% $SiO_2$) to reduce the fusion temperature of the charge below about 2800° F. If necessary, silica in the form of sand can be added to the charge to make up any deficiency of this constituent in the rock.

The charge consisting of the reagent mixture and the phosphate rock can be introduced directly into a suitable high temperature reaction apparatus without prior mixing of the charge constituents. However, I presently prefer to premix the reagents and the phosphate rock, advantageously in a pug mill or the like, and then form agglomerates, pellets or nodules of this charge mix, advantageously in the type of nodulizing apparatus described in my copending application Serial No. 699,698, filed November 29, 1957. The somewhat moist freshly made nodules have sufficient structural strength to be introduced directly into a thermal reactor such as a rotary kiln where they are immediately dried due to the intense heat within the kiln. However, I presently prefer to dry the moist "green" nodules in suitable drying apparatus to obtain a dry nodulized feed material having quite substantial structural strength. These dried nodules can be stored indefinitely for subsequent calcination at the operator's convenience. Due to their substantially uniform size and shape, they exhibit excellent flow characteristics as they progress through a rotary kiln and are particularly suitable for use when the calcination is carried out in a fluidized bed reactor. Moreover, the finely divided particles of rock inevitably present in the phosphate rock material are thoroughly incorporated in the nodules with the result that there is a substantial reduction in the dust loss in the course of the calcination operation.

The charge mixture is then calcined in any suitable high temperature reaction apparatus in which the charge can be heated in the presence of water vapor and without substantial fusion to a temperature of at least about 2200° F., and not more than about 2700° F. The process has been successfully carried out on a commercial scale in a rotary kiln 8 feet in diameter and 180 feet long and also in a fluidized bed reactor. When the calcination is carried out in a rotary kiln, the charge mixture can be introduced into the kiln in the form of a slurry such as that described in the aforementioned Patent No. 2,839,377, although in such case some of the advantages inherent in my process are not realized. However, in my preferred practice the reagents and phosphate rock are premixed and are nodulized as previously described. As noted, the moist freshly made nodules can be fed directly into the kiln without any intermediate treatment; however, I presently prefer to dry the nodules prior to introducing them into the kiln. In either case no extraneous water is added to the nodulized charge, the water vapor contained in the combustion gases within the kiln being sufficient to insure effective defluorination of the rock. When the process is carried out in a fluidized bed reactor, the charge mixture is preferably nodulized, and preferably dried, prior to introduction into the reactor.

As noted, the reaction temperature is within the range of about 2200° and 2700° F. When the process is carried out in a rotary kiln, I presently prefer to operate with a charge temperature within the range of about 2400° to 2700° F. in order to obtain a higher rate of production than would otherwise be possible, if, for example, the temperature were within the range of 2200° to 2400° F. On the other hand, when the process is carried out in a fluidized bed reactor, there is such intimate contact between the charge particles and the hot gases that I presently prefer to operate at a temperature within the range of about 2200° to 2500° F. Both types of operation at these temperatures produce effective defluorination.

The time required to defluorinate the charge will depend on the average reaction temperature, the type of apparatus employed, the particle size of the phosphate material, the intimacy of contact between the phosphate particles and the hot gaseous atmosphere, the size and porosity of the nodules, and the like. In general, the retention period of the charge in a rotary kiln is between about 30 to 90 minutes, and in a fluidized bed reactor is between about 30 to 60 minutes.

The following Table I illustrates the effect of varying calcination temperatures and periods for five different charge mixtures, charge mixtures A, B and C being representative of relatively low, relatively high and the presently preferred values, respectively, for the added $P_2O_5$ content in accordance with the invention. The data presented in Table I was obtained from laboratory burns of charge samples having the specified compositions. It has been found from experience that a laboratory burn time of from 10 to 20 minutes is equivalent to a charge retention time of from 30 to 90 minutes in a commercial rotary kiln.

The compositions of the charges referred to in Table I, and the mol ratios of the charge formula for these charges, are given in the following Table II:

*Table II*

| Feed No. | | Charge Composition | | | | | Formula [1] Mol Ratio |
|---|---|---|---|---|---|---|---|
| | | Percent Wt. | $P_2O_5$ | $SiO_2$ | CaO | $Na_2O$ | |
| A1 | Phosphate | 87.2 | 35.12 | 3.88 | 50.71 | | |
| | $P_2O_5$ | 8.0 | 100.00 | | | | |
| | $Na_2O$ | 4.8 | | | | 100.00 | .89 |
| | Cal. Feed | 100.0 | 38.62 | 3.38 | 44.22 | 4.80 | |
| A2 | Phosphate | 86.4 | 35.12 | 3.88 | 50.71 | | |
| | $P_2O_5$ | 8.0 | 100.00 | | | | |
| | $Na_2O$ | 5.6 | | | | 100.00 | |
| | Cal. Feed | 100.0 | 38.34 | 3.35 | 43.81 | 5.60 | 1.10 |
| B1 | Phosphate | 82.4 | 35.12 | 3.88 | 50.71 | | |
| | $P_2O_5$ | 11.0 | 100.00 | | | | |
| | $Na_2O$ | 6.6 | | | | 100.00 | |
| | Cal. Feed | 100.0 | 39.94 | 3.20 | 41.79 | 6.60 | −.15 |
| B2 | Phosphate | 81.3 | 35.12 | 3.88 | 50.71 | | |
| | $P_2O_5$ | 11.0 | 100.00 | | | | |
| | $Na_2O$ | 7.7 | | | | 100.00 | |
| | Cal. Feed | 100.0 | 39.55 | 3.15 | 41.23 | 7.70 | .45 |
| C1 | Phosphate | 84.5 | 35.12 | 3.88 | 50.71 | | |
| | $P_2O_5$ | 9.5 | 100.00 | | | | |
| | $Na_2O$ | 6.0 | | | | 100.00 | |
| | Cal. Feed | 100.0 | 39.18 | 3.28 | 42.85 | 6.00 | .61 |

[1] Formula:

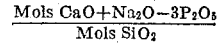

$$\frac{\text{Mols CaO} + \text{Na}_2\text{O} - 3\text{P}_2\text{O}_5}{\text{Mols SiO}_2}$$

Satisfactory defluorination of the charge and relatively high phosphate availability of the product can be obtained in the practice of my invention at temperatures as low as 2200° F. as shown in Table III below. The data presented in Table III was derived from tests conducted in a fluidized bed reactor.

*Table I*

| Feed No. | Percent Added $P_2O_5$ | $Na_2O/P_2O_5$ Weight Ratio | Calcining Temperature, °F. | Calcining Time at temp., Minutes | Clinker Analysis | | | | |
|---|---|---|---|---|---|---|---|---|---|
| | | | | | Percent F. | Percent $P_2O_5$ | | | |
| | | | | | | Total | Available | | NAC [1] |
| | | | | | | | 0.4 Percent HCl | 2 Percent Citric Acid | |
| A1 | 8.0 | 0.60 | 2,200 | 10 | 1.12 | | | | |
| | | | | 20 | 1.02 | | | | |
| | | | 2,400 | 10 | 0.50 | | | | |
| | | | | 20 | 0.20 | | | | |
| | | | 2,600 | 10 | 0.035 | 41.58 | 41.53 | 35.35 | 32.72 |
| | | | | 20 | 0.002 | | | | |
| A2 | | 0.70 | 2,200 | 10 | 1.20 | | | | |
| | | | | 20 | 0.88 | | | | |
| | | | 2,400 | 10 | 0.31 | | | | |
| | | | | 20 | 0.17 | | | | |
| | | | 2,600 | 10 | 0.002 | 41.24 | 41.36 | 38.73 | 37.40 |
| | | | | 20 | 0.002 | | | | |
| B1 | 11.0 | 0.60 | 2,200 | 10 | 0.65 | | | | |
| | | | | 20 | 0.35 | | | | |
| | | | 2,400 | 10 | 0.060 | | | | |
| | | | | 20 | 0.028 | | | | |
| | | | 2,600 | 10 | 0.002 | 42.55 | 42.62 | 32.25 | [1] 25.85 |
| | | | | 20 | 0.002 | | | | |
| B2 | | 0.70 | 2,200 | 10 | 0.72 | | | | |
| | | | | 20 | 0.43 | | | | |
| | | | 2,400 | 10 | 0.83 | | | | |
| | | | | 20 | 0.021 | | | | |
| | | | 2,600 | 10 | 0.002 | 41.94 | 41.57 | 39.07 | 38.89 |
| | | | | 20 | 0.002 | | | | |
| C | 9.5 | 0.63 | 2,200 | 10 | 1.08 | | | | |
| | | | | 20 | 0.60 | | | | |
| | | | 2,400 | 10 | 0.20 | | | | |
| | | | | 20 | 0.038 | | | | |
| | | | 2,600 | 10 | 0.002 | 41.87 | 41.86 | 35.91 | 33.40 |
| | | | | 20 | 0.002 | | | | |

[1] Neutral ammonium citrate.

Table III

| Calcining Temperature | Clinker Analysis | | | | |
|---|---|---|---|---|---|
| | Percent F | Percent $P_2O_5$ | | | |
| | | Total | Available | | |
| | | | 0.4% HCl | 2% Citric | NAC |
| 2,000° F | 0.70 | | | | |
| 2,100° F | 0.35 | | | | |
| 2,200° F | 0.12 | 41.47 | 41.26 | 38.78 | 38.11 |

The increase in efficiency and productivity obtained by the practice of my invention is shown in Tables IV and V.

Table IV presents plant operating data that was obtained for the process described in United States Patent 2,839,377 in which process the charge formula mol ratio is maintained between 1.3 and 2.8. In this process, it has been found that when the amount of $P_2O_5$ added to the charge falls below about 3% by weight of the total charge the process becomes impractical due to operating difficulties and low tonnage output, whereas when the amount of $P_2O_5$ added to the charge exceeds about 6% by weight of the total charge the leveling off in the increase in productivity renders the process uneconomic.

Table IV

| $Na_2O/P_2O_5$, Wt. Ratio | Percent Added $P_2O_5$ | Percent Increase In Added $P_2O_5$ | Kiln Feed Rate, Tons Per Hour | Percent Increase in Feed Rate |
|---|---|---|---|---|
| 0.92 | 3.00 | | 5.97 | |
| 0.88 | 4.00 | 33.3 | 6.63 | 11.1 |
| 0.83 | 5.42 | 35.5 | 7.78 | 17.3 |

Table V presents plant operating data that was obtained for the improved process described herein in which process the charge formula mol ratio is maintained below about 1.1. In the practice of the present process it has been found that when the amount of $P_2O_5$ added to the charge is less than about 7% by weight of the charge the process becomes impractical due to fusion of the charge which prevents defluorination and causes kiln ringing problems, whereas when the amount of $P_2O_5$ added to the charge exceeds about 12% by weight of the total charge the $P_2O_5$ tends to volatilize with consequent leveling off in the increase in efficiency and productivity.

Table V

| $Na_2O/P_2O_5$ Wt. Ratio | Percent Added $P_2O_5$ | Percent Increase in added $P_2O_5$ | Feed Rate, Tons/Hour | Percent increase in Feed Rate | Fuel Oil Consumption, Gallons/Ton of Clinker | Percent Decrease in Fuel Oil Consumption |
|---|---|---|---|---|---|---|
| 0.76 | 6.75 | | 8.25 | | 72.0 | 12.8 |
| 0.65 | 8.26 | 22.4 | 10.17 | 23.3 | 45.1 | 19.9 |
| 0.61 | 10.00 | 21.1 | 12.38 | 21.7 | | |

The increase in feed rate corresponding to the increase in $P_2O_5$ added to the charge reported in Table IV for the process of United States Patent 2,839,337 and reported in Table V for the present process are shown graphically in the drawing. The main portions of both of the curves shown in the drawing are based upon the plant operating data reported in Tables IV and V, respectively. The upper portions of both of these curves are based upon data obtained from laboratory and pilot plant investigations of the two processes.

The following specific example is illustrative of the practice of my invention and is based upon conditions, charge compositions and results averaged over an operating period of one month in a commercial plant operating at an average feed rate of about 14 tons of feed per hour. The charge averaged 83.46% by weight of phosphate rock, 10.28% by weight of crude phosphoric acid (calculated as $P_2O_5$) and 6.26% by weight of commercial light soda ash (calculated as $Na_2O$). The phosphate rock average 35.89% by weight of $P_2O_5$, 50.9% by weight of CaO and 3.09% by weight of $SiO_2$. The average weight ratio of added $Na_2O$ to added $P_2O_5$ in the charge was 0.61, and the average charge formula mol ratio was 0.61. (The fact that the $Na_2O/P_2O_5$ weight ratio and the charge formula ratio are the same is merely coincidental and is without significance. The charge was thoroughly mixed and was then calcined in a commercial rotary kiln at a temperature of between 2600 to 2700° F. The average charge compositions, ratios and results are reported in Table V.

Table VI

| Percent Added $P_2O$ | $Na_2O/P_2O_5$ Weight Ratio | Analyses | | | | |
|---|---|---|---|---|---|---|
| | | Percent F | Percent $P_2O_5$ | | | |
| | | | Total | Available | | |
| | | | | 0.4% HCl | 2% Citric Acid | NAC |
| 10.28 | 0.61 | 0.11 | 40.94 | 40.47 | 38.53 | 37.55 |

FORMULA MOL RATIO CALCULATIONS FROM FEED DATA

| | Percent Weight | $P_2O_5$ | $SiO_2$ | CaO | $Na_2O$ | Formula Mol Ratio |
|---|---|---|---|---|---|---|
| Rock | 83.46 | 35.89 | 3.09 | 50.90 | | |
| $P_2O_5$ | 10.28 | 100.00 | | | | |
| $Na_2O$ | 6.26 | | | | 100.00 | |
| | 100.00 | 39.40 | 2.58 | 42.48 | 6.26 | 0.61 |

It will be seen seen from the foregoing description of my invention that I have made an important contribution to the art of defluorinating phosphate rock.

I claim:

1. In the method of defluorinating phosphate rock which comprises heating the rock at an elevated temperature without substantial fusion in the presence of water vapor and of an added sodium compound of the group consisting of sodium carbonate, sodium bicarbonate, sodium hydroxide, sodium phosphates and sodium chloride and an added acid phosphate compound of the group consisting of the phosphorous acids and their acid sodium salts, and maintaining the charge at said elevated temperature for a sufficient time to produce a defluorinated phosphate product, the improvement which comprises proportioning the relative amounts of phosphate rock, silica, added sodium compounds and added phosphate compounds present in the charge mixture so that the weight ratio of the added sodium compound (calculated as $Na_2O$) to the added acid phosphate compound (calculated as $P_2O_5$) is between about 0.5 and 0.8, the amount of the acid phosphate compound (calculated as $P_2O_5$) added to the charge is between about 7% and 12% by weight of the total charge on a dry basis, the total amount of sodium compounds (calculated as $Na_2O$) in the charge is between about 0.3 mol and 0.7 mol per mol of $P_2O_5$ present in the phosphate rock, the silica content of the charge is between about 2% and 6% by weight of the total charge on a dry basis, and the CaO, $Na_2O$, $P_2O_5$ and $SiO_2$ content of the combined phosphate rock and added reagents is such that the mol ratio of these constituents in the formula $$\frac{\text{Mols CaO}+\text{Na}_2\text{O}-3\text{P}_2\text{O}_5}{\text{Mols SiO}_2}$$

does not exceed 1.1, and heating the charge at a temperature of at least about 2200° F. and below that at which fusion of the charge occurs for a sufficient time to produce a phosphate product having high fertilizer availability and containing less than 1 part of fluorine per each 100 parts of phosphorus.

2. In the method of defluorinating phosphate rock which comprises heating the rock at an elevated temperature without substantial fusion in the presence of water vapor and of an added sodium compound of the group consisting of sodium carbonate, sodium bicarbonate, sodium hydroxide, sodium phosphates and sodium chloride and an added acid phosphate compound of the group consisting of the phosphorous acids and their acid sodium salts, and maintaining the charge at said elevated temperature for a sufficient time to produce a defluorinated phosphate product, the improvement which comprises proportioning the relative amounts of phosphate rock, silica, added sodium compounds and added acid phosphate compounds present in the charge mixture so that the weight ratio of the added sodium compound (calculated as $Na_2O$) to the added phosphatic compound (calculated as $P_2O_5$) is between about 0.6 and 0.7, the amount of the acid phosphate compound (calculated as $P_2O_5$) added to the charge is between about 9% and 10% by weight of the total charge on a dry basis, the total amount of sodium compounds (calculated as $Na_2O$) in the charge is between about 0.3 mol and 0.7 mol per mol of $P_2O_5$ present in the phosphate rock, the silica content of the charge is between about 2.5% and 4.5% by weight of the total charge on a dry basis, and the CaO, $Na_2O$, $P_2O_5$ and $SiO_2$ content of the combined phosphate rock and added reagents is such that the mol ratio of these constituents in the formula $$\frac{\text{Mols CaO}+\text{Na}_2\text{O}-3\text{P}_2\text{O}_5}{\text{Mols SiO}_2}$$

is between about 0.4 and 0.8, and heating the charge at a temperature of between about 2200° and 2700° F. for a sufficient time to produce a phosphate product having high fertilizer availability and containing less than 1 part of fluorine per each 100 parts of phosphorus.

3. In the method of defluorinating phosphate rock which comprises heating a charge containing the rock at an elevated temperature without substantial fusion and in the presence of water vapor, the charge consisting essentially of the rock, an added sodium compound of the group consisting of sodium carbonate, sodium bicarbonate, sodium hydroxide, sodium phosphates and sodium chloride and an added acid phosphate compound of the group consisting of the phosphorus acids and their acid sodium salts, and maintaining the charge at said elevated temperature for a sufficient time to produce a defluorinated phosphate product, the improvement which comprises proportioning the relative amounts of phosphate rock, silica, added sodium compounds and added acid phosphate compounds present in the charge mixture so that the weight ratio of the added sodium compound (calculated as $Na_2O$) to the added acid phosphate compound (calculated as $P_2O_5$) is between about 0.5 and 0.8, the amount of the acid phosphate compound (calculated as $P_2O_5$) added to the charge is between about 7% and 12% by weight of the total charge on a dry basis, the total amount of sodium compounds (calculated as $Na_2O$) in the charge is between about 0.3 mol and 0.7 mol per mol of $P_2O_5$ present in the phosphate rock, the silica content of the charge is between about 2% and 6% by weight of the total charge on a dry basis, and the CaO, $Na_2O$, $P_2O_5$ and $SiO_2$ content of the combined phosphate rock and reagent charge mixture is such that the mol ratio of these constituents in the formula $$\frac{\text{Mols CaO}+\text{Na}_2\text{O}-3\text{P}_2\text{O}_5}{\text{Mols SiO}_2}$$

does not exceed 1.1, and heating the charge at a temperature of between about 2200° and 2700° F. for a sufficient time to produce a phosphate product having high fertilizer availability and containing less than 1 part of fluorine per each 100 parts of phosphorus.

4. The method according to claim 3 in which the added sodium compound is sodium carbonate and in which the added acid phosphate compound is phosphoric acid.

5. The method according to claim 3 in which the charge mixture is agglomerated prior to heating the charge.

6. The method according to claim 5 in which the charge agglomerates are dried prior to heating the agglomerates.

7. The method according to claim 5 in which the charge agglomerates are calcined in a rotary kiln at a temperature within the range of about 2400° and 2700° F.

8. The method according to claim 5 in which the charge agglomerates are calcined in a fluidized bed established in a fluosolids reactor at a temperature within the range of about 2200° and 2500° F.

9. The method according to claim 5 in which the charge agglomerates are calcined in the absence of extraneous water other than that contained in the agglomerates and in the combustion gasses in contact with the agglomerates.

10. A defluorinated phosphate rock product having high fertilizer availability and containing less than one part of fluorine for each 100 parts of phosphorus, said product being produced by heating a charge containing the rock at an elevated temperature without substantial fusion and in the presence of water vapor, the charge consisting essentially of the rock, an added sodium compound of the group consisting of sodium carbonate, sodium bicarbonate, sodium hydroxide, sodium phosphates and sodium chloride and an added acid phosphate compound of the group consisting of the phosphorus acids and their acids sodium salts, the relative amount of phosphate rock silica, added sodium compounds and added acid phosphate compounds present in the charge mixture being proportioned so that the weight ratio of the added sodium compound (calculated as $Na_2O$) to the added acid phosphate compound (calculated as $P_2O_5$) is between about 0.5 and 0.8, the amount of the acid phosphate compound (calculated as $P_2O_5$) added to the charge is between about 7% and 12% by weight of the total charge on a dry basis, the total amount of sodium compounds (calculated as $Na_2O$) in the charge is between about 0.3 mol and 0.7 mol per mol of $P_2O_5$ present in the phosphate rock, the silica content of the charge is between about 2% and 6% by weight of the total charge on a dry basis, and the CaO, $Na_2O$, $P_2O_5$ and $SiO_2$ content of the combined phosphate rock and added reagent mixture is such that the mol ratio of these constituents in the formula $$\frac{\text{Mols CaO}+\text{Na}_2\text{O}-3\text{P}_2\text{O}_5}{\text{Mols SiO}_2}$$

does not exceed 1.1, the charge being heated at a temperature of between about 2200° and 2700° F. for a sufficient time to produce the aforesaid product.

References Cited in the file of this patent

UNITED STATES PATENTS

| | | |
|---|---|---|
| 2,754,191 | Hollingsworth | July 10, 1956 |
| 2,839,361 | Hollingsworth | June 17, 1958 |
| 2,839,377 | Hollingsworth | June 17, 1958 |